July 14, 1936.     C. L. CONNERS     2,047,311
WEIGHING SCALE
Filed July 19, 1934     2 Sheets-Sheet 2

INVENTOR.
CARL L. CONNERS
BY
ATTORNEYS.

Patented July 14, 1936

2,047,311

UNITED STATES PATENT OFFICE 2,047,311

WEIGHING SCALE

Carl L. Conners, Louisville, Ky., assignor to
Walter F. Stimpson, Detroit, Mich.

Application July 19, 1934, Serial No. 735,925

3 Claims. (Cl. 265—27)

This invention relates to weighing scales, and particularly those of the variety incorporating a main lever actuable upon loading of the scale, together with spring type load counterbalancing means and a rack rod or the like for indicator actuation. All of the elements referred to must, of course, be connected together in one manner or another, and many constructions have been employed for this purpose. In modern scales in which these parts are all encased, the consumption of room is an important consideration. An object of the present invention, therefore, is the provision of connecting means for the several elements mentioned which although improved and rendered less expensive of construction consumes less space within the scale housing than any apparatus of comparable effectiveness heretofore used.

Another important object is the provision of improved connecting means for the main lever, load counterbalancing and indicator actuating elements of a weighing scale which is of simpler and less expensive construction yet proportionately stronger and freer from distortion than arrangements previously known, and in which the several parts are readily accessible for adjustment and servicing.

A further object is the provision of improved means for releasably locking desired parts of a weighing scale against movement and relieving strain therefrom during shipping and the like.

Other objects and advantages will be apparent from the following description, wherein reference is made to the accompanying drawings illustrating a preferred embodiment of my invention, and wherein similar reference numerals designate similar parts throughout the several views.

Figure 1:
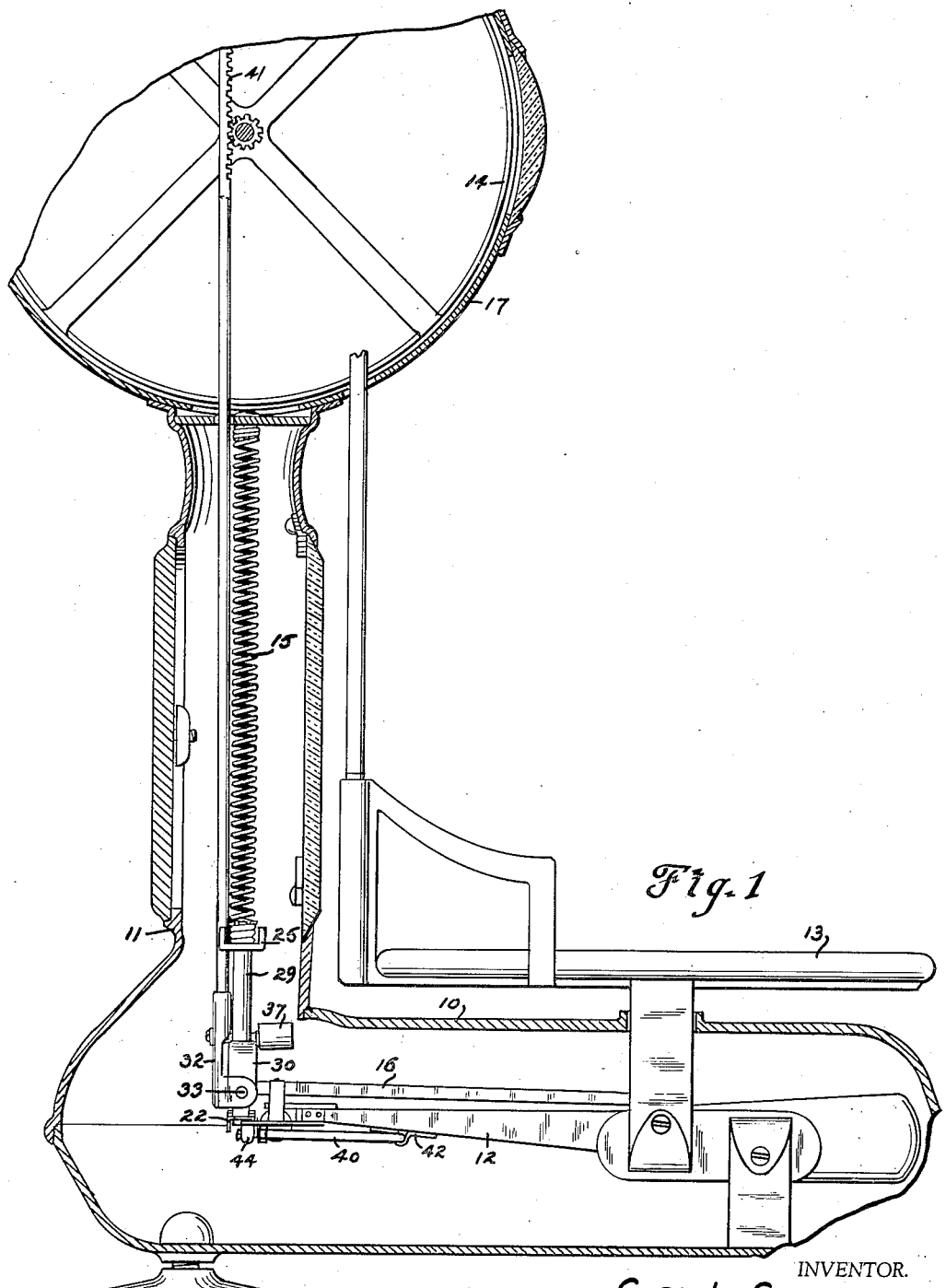
Figure 1 is a fragmentary vertical section of a weighing scale incorporating the principles of my invention.

Referring now to the drawings, in which parts other than those involved in the present invention are indicated more or less conventionally both as to showing and arrangement, reference character 10 designates a horizontal casing portion adapted to house the main lever 12 and other portions of the scale mechanism as well as serve as a base, over which and connected to the lever a platform as 13 is ordinarily arranged, while from the back of casing section 10 rises a vertical columnar extension thereof 11 through which connecting parts extend to a rotatable indicator cylinder 14 arranged above in a transverse drum casing 17. The column 11 also houses the load counterbalancing springs 15, and other portions of the mechanism, as will be understood.

The main lever 12 carries a nose iron portion 16, which is longitudinally movable relatively thereto and controlled in such movement by a thermostat 18 adapted to compensate for temperature changes, although except for such controlled thermostat-induced movement the nose iron moves as a unit with the main lever. The nose iron transmits the load through a transverse knife edge pivot 20, which rests upon a V'd bearing block 21 of agate or the like. The bearing block is housed in a sheet metal cage 23 which is in turn pivotally supported by a saddle 22 formed of a transverse inverted channel centrally apertured in its horizontal top face to loosely receive the bearing assembly 21—23, which is rockably supported in the saddle by means of the out turned flanges 24 carried by the front and back faces of the bearing cage and whose edges are slightly V'd and overengage the side flanges of the saddle to pivotally support the bearing, which may in addition be loosely secured against displacement by a wire clip 27.

Figures 2, 3:
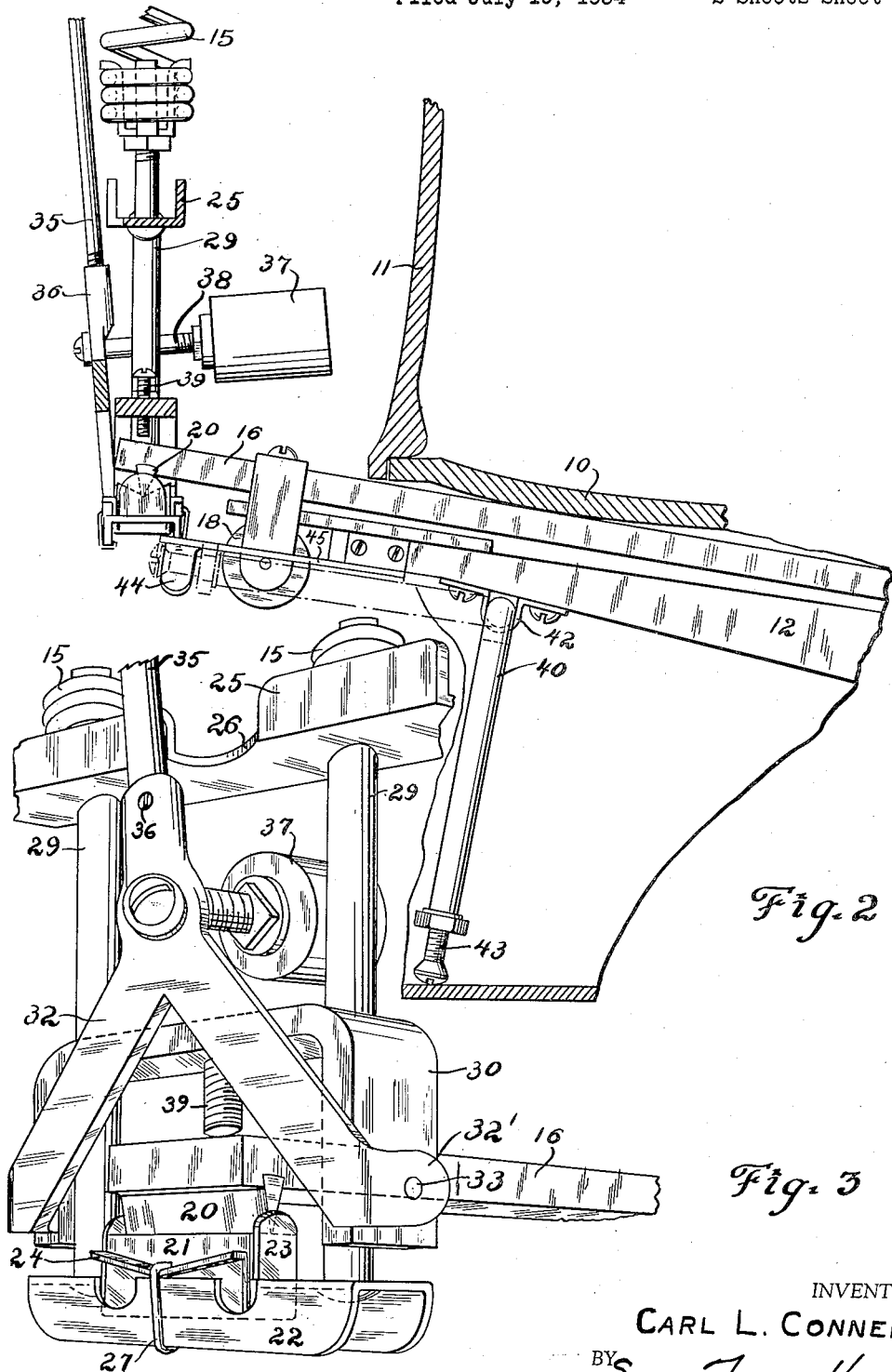
Figure 2 is a side elevation view of certain parts.
Figure 3 is a perspective view of the connecting assembly.

Two posts 29 are fast at their lower ends in the saddle, one upstanding on either side of the bearing block assembly. The posts extend upwardly within the column 11 and carry at their tops a transverse spring retainer 25, to which the springs 15 are secured in the manner best shown in Figure 1. As shown in Figure 2, two spaced springs are preferably used, one connected near each post.

Securely fastened to the posts is an inverted U-bracket 30, through the bight of which the posts extend, while the legs of the bracket extend downwardly beside but clear of the posts. A yoke 32, of inverted Y form, is pivoted upon pins 33 extending through ears 32' integrally bent rearwardly at the ends of the yoke arms and into the bracket. This arrangement will be seen to permit swinging of the yoke and the rack rod carried thereby about an axis transverse to the nose iron. Secured in an upwardly opening socket in the yoke is a rack rod 35, which may be held in place by means of a set screw as 36. Since the teeth 41 carried by the end of the upper extremity of the rack rod are upon the platform side thereof, in order to yieldably hold such teeth in engagement with the pinion I provide a weight as 37 carried by an arm 38 projecting between the posts 29 above the bracket 30. The spring retainer 25 may be cut away as at 26 to provide clearance for swinging movement of the rack rod, and the nose iron may be restrained from accidental displacement with respect to the bearing by means of a stop screw 39 threaded in and projecting downwardly from the bracket.

In order to hold the main lever, nose iron and all connecting parts including the rack rod and indicator against undesired movement and relieve strain thereupon during shipping or other handling of the scale, I preferably provide a swinging arm 40 hinged upon the under side of the main lever, as in the double bent bracket 42, and of such length that a bearing stud 43 carried by and threaded in its end may be adjusted to tightly bear against the bottom of the housing when the arm is lowered to the position indicated in full lines in Figure 2. When adjusted to fit tightly in this position, the arm 40 wedges the nose iron against the under side of the top of the casing 10, thereby locking it against movement. As also indicated in dot-dash lines in that view, the arm 40 may be swung to a raised position in which it lies parallel to and immediately beneath the main lever, freeing the same for normal movement, so that when the scale is unloaded the parts assume the approximate positioning indicated in Figure 1. The wedging arm may be held in raised position when the scale is in service by means of a spring clip or the like as 44, shown carried by an arm 45 extending forwardly from the end of the lever.

Thus if in original shipment from the factory the bearings are guarded, as by rubber encasing the knife edge pivots and separating them from the bearings, the stud or foot 43 may be adjusted to wedge the lever tightly when lowered, while after removal of such rubber guards the foot may be readjusted to again enable properly wedging the lever despite the change in its positioning caused by removing the guards.

By reason of the close arrangement and interfitting of the parts carried by the nose iron and serving to connect the several elements, the saving of room is such as to allow greater angular travel of the main lever than would otherwise be possible in the same space, as well as permit use of a smaller casing if desired.

While it will be apparent that the illustrated embodiment of my invention herein disclosed is well calculated to adequately fulfill the objects and advantages primarily stated, it is to be understood that the invention is susceptible to variation, modification and change within the spirit and scope of the subjoined claims.

What I claim is:

1. In a weighing scale, load counter-balancing means including a pair of spaced substantially vertical coil springs, means for stressing the springs in response to loading of the scale including a main lever having a nose portion extending beenath the springs and substantially midway between their extended axes, an indicator actuating rod actuable by and extending vertically in substantial alignment with the nose of the lever, and a coupling assembly for connecting said nose portion of the lever to the springs and to the rod, comprising a transverse saddle portion extending beneath said nose portion of the lever, cooperating bearing portions carried by said nose portion and saddle, vertical column portions connected to said saddle portion and extending upwardly on either side of the lever and bearing portions, means carried by the tops of said column portions for attachment to said springs, means pivotally connecting said indicator actuating rod and the coupling assembly on either side of said bearing portions, and yieldable means urging the rod laterally in a desired direction and projecting between said column portions.

2. In a weighing scale construction, load counterbalancing means including a spring, means for stressing the spring in response to loading of the scale including a main lever, indicator actuating means actuable by the main lever, and a coupling assembly for connecting the main lever to the spring and to the indicator actuating means comprising a saddle element, a bearing element carried by the saddle element, a cooperating bearing element carried by the main lever, column portions carried by the saddle element and extending upwardly on either side of the lever and bearing elements, means carried by the tops of said column portions for connection to said spring counter-balancing means, and means pivotally connecting said indicator actuating means and the coupling assembly, the axis of such pivotal connection being in substantial alignment with that of the connection provided by said bearing elements.

3. In a weighing scale construction, load counterbalancing means including a pair of springs arranged for substantially vertical stressing, means for so stressing the springs in response to loading of the scale including a main lever, an indicator actuating rod actuable by the main lever, and a coupling assembly for connecting the main lever to the springs and to the indicator actuating means, said assembly comprising a substantially horizontal saddle element, a bearing element carried by the saddle element, a cooperating bearing element carried by the main lever, connecting portions extending vertically upwardly from the saddle element on either side of said lever and bearing elements, means carried by the tops of said connecting portions for attachment to said springs, and means pivotally connecting said indicator actuating means and the coupling assembly on opposite sides of the bearing elements.

CARL L. CONNERS.